(12) United States Patent
Son et al.

(10) Patent No.: US 9,100,884 B2
(45) Date of Patent: Aug. 4, 2015

(54) METHOD AND APPARATUS FOR PERFORMING HANDOVER IN WIRELESS COMMUNICATION SYSTEM

(75) Inventors: Hyukmin Son, Anyang-si (KR); Hyunwoo Lee, Anyang-si (KR); Hyeyoung Choi, Anyang-si (KR); Seunghee Han, Anyang-si (KR); Jinmin Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 38 days.

(21) Appl. No.: 14/128,546

(22) PCT Filed: Jul. 9, 2012

(86) PCT No.: PCT/KR2012/005413
§ 371 (c)(1),
(2), (4) Date: Dec. 20, 2013

(87) PCT Pub. No.: WO2013/009054
PCT Pub. Date: Jan. 17, 2013

(65) Prior Publication Data
US 2014/0140323 A1 May 22, 2014

Related U.S. Application Data

(60) Provisional application No. 61/506,152, filed on Jul. 10, 2011, provisional application No. 61/522,215, filed on Aug. 10, 2011.

(51) Int. Cl.
*H04W 36/00* (2009.01)

(52) U.S. Cl.
CPC ...... *H04W 36/0083* (2013.01); *H04W 36/0055* (2013.01); *H04W 36/0094* (2013.01)

(58) Field of Classification Search
CPC ............ H04W 36/00; H04W 36/0005; H04W 36/0011; H04W 36/0022; H04W 36/0055; H04W 36/0083; H04W 36/0094; H04W 8/22; H04W 8/02; H04W 48/00; H04W 48/20
See application file for complete search history.

(56) References Cited

U.S. PATENT DOCUMENTS 5,590,409 A 12/1996 Sawahashi et al.
8,570,957 B2 * 10/2013 Ball et al. ...................... 370/329
(Continued)

OTHER PUBLICATIONS

Tekinay, et al., "A Measurement-Based Prioritization Scheme for Handovers in Mobile Cellular Networks," IEEE Journal on selected areas in communications, vol. 10, No. 8, Oct. 1992, pp. 1343-1350.
(Continued)

*Primary Examiner* — Anh Ngoc Nguyen
(74) *Attorney, Agent, or Firm* — Lee, Hong, Degerman, Kang & Waimey

(57) ABSTRACT

A method and apparatus for performing a handover in a wireless communication system are disclosed. The method for performing a handover of a user equipment (UE) in a wireless communication system includes measuring a first reception power from a first transmission point and a second reception power from a second transmission point; and determining transmission of a measurement report for the handover to the second transmission point. The transmission of the measurement report is determined using the first reception power, the second reception power, an offset value, and a value related to uplink transmission power of the user equipment (UE).

13 Claims, 12 Drawing Sheets

(a)

(b)

(56) References Cited

U.S. PATENT DOCUMENTS

2011/0319112 A1* 12/2011 Jeong et al. .................. 455/509
2012/0082041 A1* 4/2012 Damnjanovic et al. ....... 370/252

OTHER PUBLICATIONS

PCT International Application No. PCT/KR2012/005413, Notification of Transmittal of the International Search Report and the Written Opinion of the International Searching Authority, or Declaration dated Jan. 21, 2013, 9 pages.

* cited by examiner

MeNB : macro eNodeB
PeNB : pico eNodeB
FeNB : femto eNodeB

MUE : macro UE
PUE : pico UE
FUE : femto eNodeB

METHOD AND APPARATUS FOR PERFORMING HANDOVER IN WIRELESS COMMUNICATION SYSTEM

CROSS-REFERENCE TO RELATED APPLICATIONS

This application is the National Stage filing under 35 U.S.C. 371 of International Application No. PCT/KR2012/005413, filed on Jul. 9, 2012, which claims the benefit of U.S. Provisional Application Serial Nos. 61/506,152, filed on Jul. 10, 2011, and 61/522,215, filed on Aug. 10, 2011, the contents of which are all hereby incorporated by reference herein in their entirety.

TECHNICAL FIELD

The present invention relates to a wireless communication system, and more particularly to a method and apparatus for performing a handover in a heterogeneous network environment.

BACKGROUND ART

Wireless communication systems are widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi-Carrier Frequency Division Multiple Access (MC-FDMA) system, and the like.

DISCLOSURE

Technical Problem

Accordingly, the present invention is directed to a method for performing a handover in a wireless communication system that substantially obviates one or more problems due to limitations and disadvantages of the related art. An object of the present invention is to provide a method for initiating a handover procedure considering uplink transmission power, i.e., a method for providing a reference for deciding measurement reporting transmission.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for performing a handover of a user equipment (UE) in a wireless communication system including measuring a first reception power from a first transmission point and a second reception power from a second transmission point; and determining transmission of a measurement report for the handover to the second transmission point, wherein the transmission of the measurement report is determined using the first reception power, the second reception power, an offset value, and a value related to uplink transmission power of the user equipment (UE).

In another aspect of the present invention, a method for performing a handover of a first transmission point in a wireless communication system includes receiving a measurement report from a user equipment (UE); requesting a handover of the user equipment (UE) to a second transmission point; and upon receiving an acknowledgement message of the request from the second transmission point, transmitting a handover command to the user equipment (UE), wherein transmission of the measurement report is determined using a first reception power from the first transmission point, a second reception power from the second transmission point, an offset value, and a value related to uplink transmission power of the user equipment (UE).

In another aspect of the present invention, a user equipment (UE) apparatus for use in a wireless communication system includes a reception module; and a processor, wherein the processor measures a first reception power from a first transmission point and a second reception power from a second transmission point, and determines transmission of a measurement report for the handover to the second transmission point, where the transmission of the measurement report is determined using the first reception power, the second reception power, an offset value, and a value related to uplink transmission power of the user equipment (UE).

In another aspect of the present invention, a first transmission point apparatus for use in a wireless communication system includes a transmission module; and a processor, wherein the processor receives a measurement report from a user equipment (UE), requests a handover of the user equipment (UE) to a second transmission point, and transmits a handover command to the user equipment (UE) upon receiving an acknowledgement message of the request from the second transmission point, where transmission of the measurement report is determined using a first reception power from the first transmission point, a second reception power from the second transmission point, an offset value, and a value related to uplink transmission power of the user equipment (UE).

The value related to the uplink transmission power may be at least one of parameters used for determining a transmission power for physical uplink shared channel (PUSCH) transmission or physical uplink control channel (PUCCH) transmission. The value related to the uplink transmission power may be a downlink pathloss compensation value.

If the sum of the second reception power and the offset value is higher than the sum of the first reception power and the value related to the uplink transmission power, the user equipment (UE) may transmit the measurement report.

If an equation $RSRP_{TP1} + 10\log_{10}\alpha_c(j) < RSRP_{TP2} + \text{offset}$ is satisfied, the user equipment (UE) may transmit the measurement report, $RSRP_{TP1}$ is a Reference Signal Received Power (RSRP) from the first transmission point corresponding to the first reception power, $RSRP_{TP2}$ is a Reference Signal Received Power (RSRP) from the second transmission point corresponding to the second reception power, offset is the offset value, $\alpha_c(j)$ is a pathloss compensation value corresponding to the value related to the uplink transmission power, and j is determined according to uplink scheduling types.

The value related to the uplink transmission power may be determined by a product of a transmission power of a physical uplink shared channel (PUSCH) and a pathloss value from the second transmission point.

If the sum of the second reception power and the offset value is higher than the first reception power and the value related to the uplink transmission power is lower than the offset value, the user equipment (UE) may not transmit the measurement report.

If equations $RSRP_{TP1} < RSRP_{TP2} + \text{offset}$ and $P_{PUSCH,c}(i) \times PL_{TP2} < \text{offset}$ are satisfied, the user equipment (UE) may transmit the measurement report, where $RSRP_{TP1}$ is a Reference Signal Received Power (RSRP) from the first transmission point corresponding to the first reception power, $RSRP_{TP2}$ is a Reference Signal Received Power (RSRP) from the second transmission point corresponding to the second reception power, offset is the offset value, $P_{PUSCH,c}(i)$ is a transmission power of a physical uplink shared channel (PUSCH) at an i-th subframe, and $PL_{TP2}$ is a downlink pathloss from the second transmission point.

The offset value may be associated with extension of the size of a cell region of the second transmission point.

The first transmission point may be a macro eNB and the second transmission point may be a micro eNB.

Advantageous Effects

Exemplary embodiments of the present invention have the following effects. The method and apparatus for performing a handover in a wireless communication system according to the embodiments of the present invention can determine transmission or non-transmission of a measurement report in consideration of uplink transmission power, such that it is possible to further consider uplink interference.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
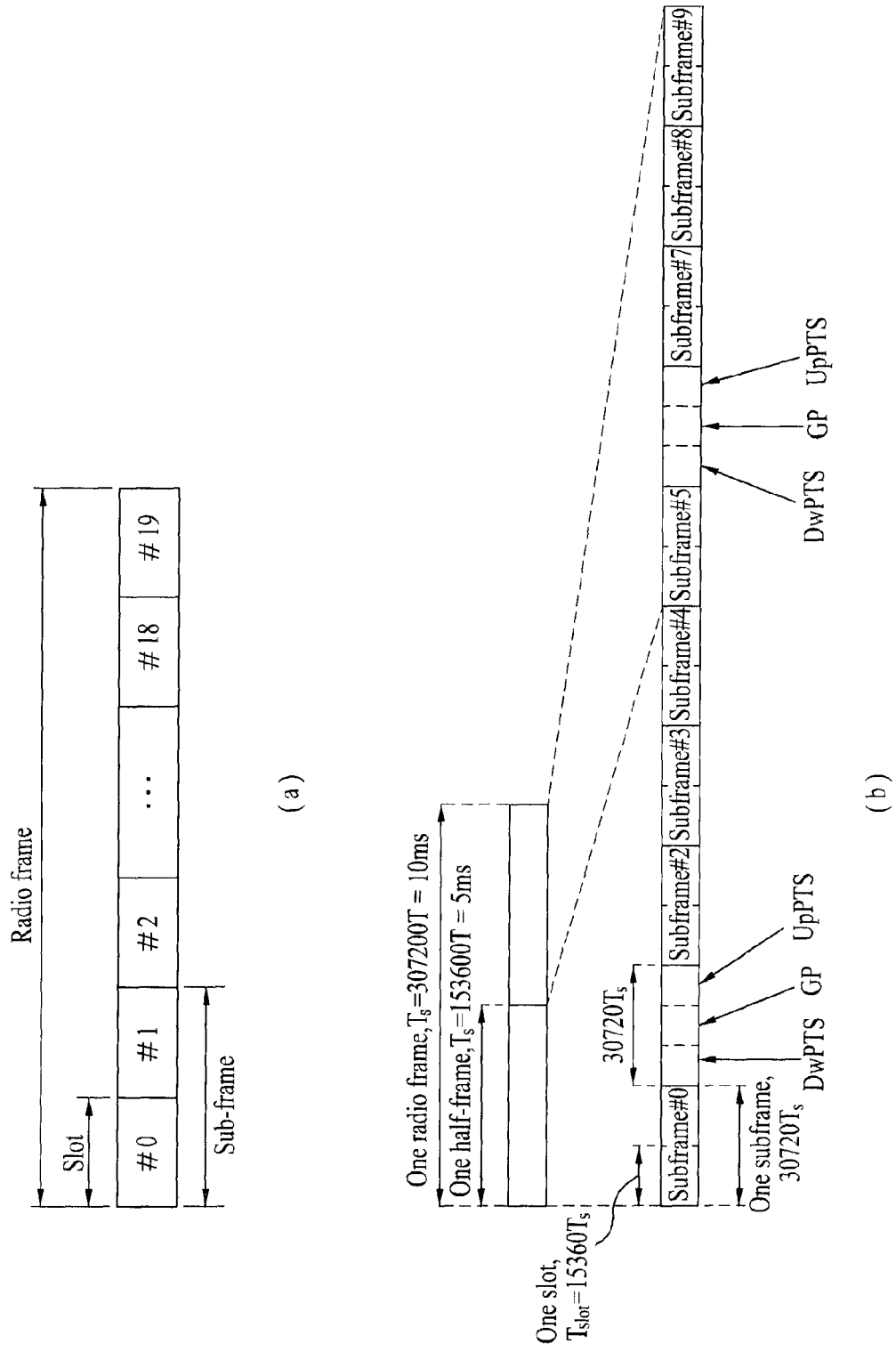
FIG. 1 exemplarily shows a radio frame structure.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (WirelessMAN-OFDMA Reference System) and advanced IEEE 802.16m (WirelessMAN-OFDMA Advanced System). For clarity, the following description focuses on IEEE 802.11 systems. However, technical features of the present invention are not limited thereto.

FIG. 1 exemplarily shows a radio frame structure.

The structure of a radio frame in 3GPP LTE system will be described with reference to FIG. 1.

In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 1(a) is a diagram showing the structure of the type 1 radio frame. A radio frame includes 10 subframes, and one subframe includes two slots in time domain. A time required for transmitting one subframe is defined in a Transmission Time Interval (TTI). For example, one subframe may have a length of 1 ms and one slot may have a length of 0.5 ms. One slot may include a plurality of OFDM symbols in time domain and include a plurality of Resource Blocks (RBs) in frequency domain. Since the 3GPP LTE system uses OFDMA in downlink, the OFDM symbol indicates one symbol duration. The OFDM symbol may be called a SC-FDMA symbol or a symbol duration. A RB is a resource allocation unit and includes a plurality of contiguous subcarriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If a channel state is instable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. That is, one subframe is composed of two slots irrespective of the radio frame type. DwPTS is used to perform initial cell search, synchronization, or channel estimation. UpPTS is used to perform channel estimation of a base station and uplink transmission synchronization of a user equipment (UE). The guard interval (GP) is located between an uplink and a downlink so as to remove interference generated in the uplink due to multi-path delay of a downlink signal. That is, one subframe is composed of two slots irrespective of the radio frame type.

The structure of the radio frame is only exemplary. Accordingly, the number of subframes included in the radio frame, the number of slots included in the subframe or the number of symbols included in the slot may be changed in various manners.

Figure 2:
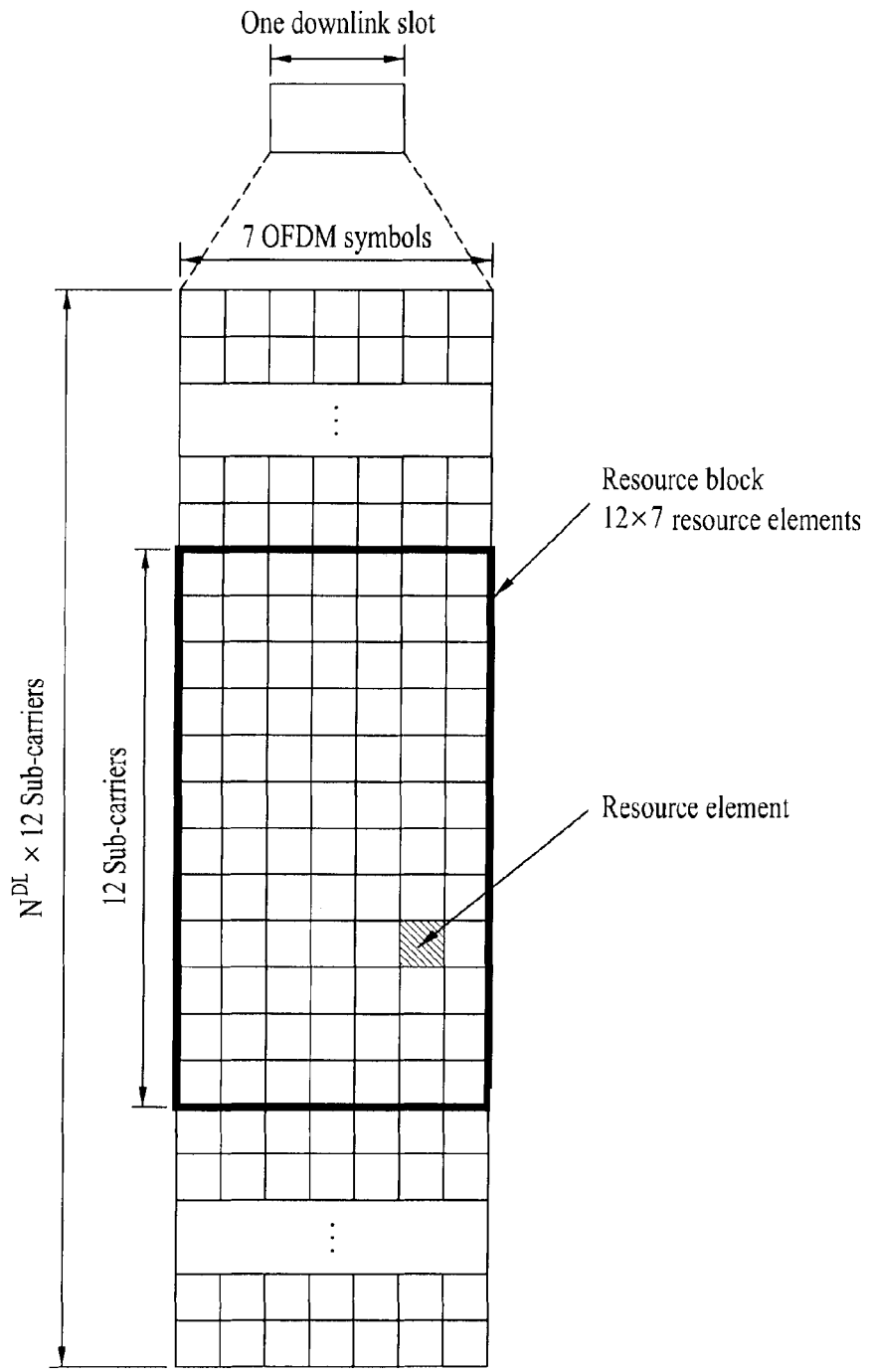
FIG. 2 exemplarily shows a resource grid of a downlink slot.

FIG. 2 is a diagram showing a resource grid in a downlink slot. Although one downlink slot includes seven OFDM symbols in a time domain and one RB includes 12 subcarriers in a frequency domain in the figure, the scope or spirit of the present invention is not limited thereto. For example, in case of a normal Cyclic Prefix (CP), one slot includes 7 OFDM symbols. However, in case of an extended CP, one slot may include 6 OFDM symbols. Each element on the resource grid is referred to as a resource element. One RB includes 12×7 resource elements. The number $N^{DL}$ of RBs included in the downlink slot is determined based on downlink transmission bandwidth. The structure of the uplink slot may be equal to the structure of the downlink slot.

Figure 3:
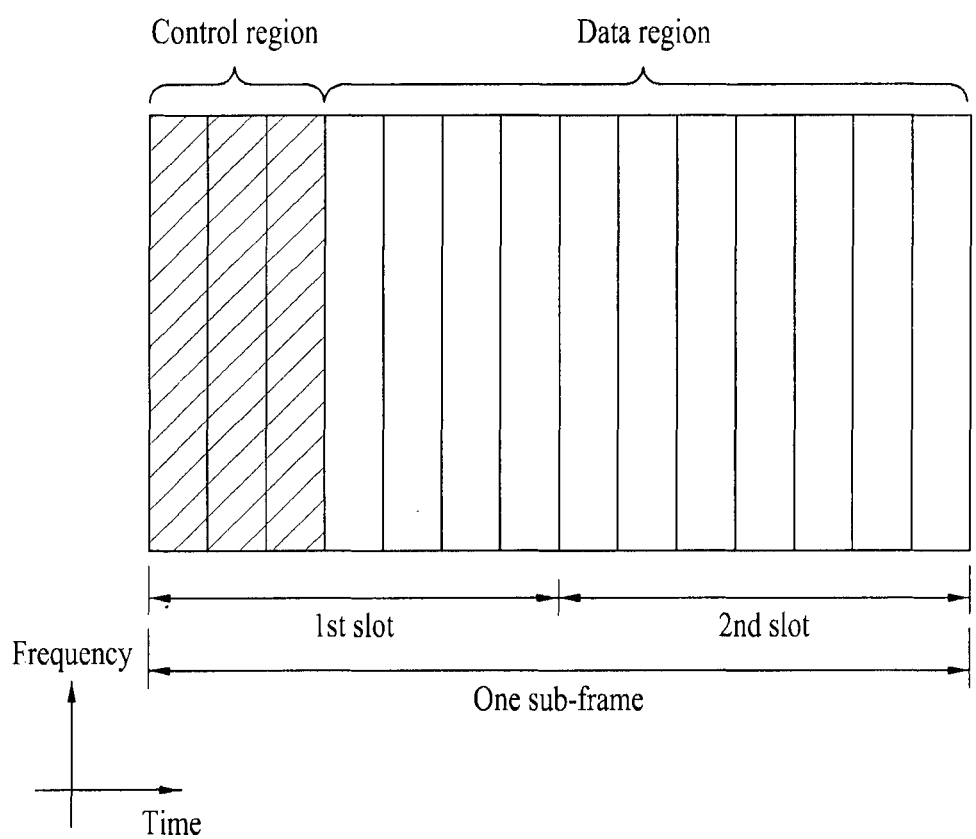
FIG. 3 is a downlink (DL) subframe structure.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission becomes one subframe. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response to uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region.

The UE may monitor the plurality of PDCCHs. The PDCCHs are transmitted on an aggregation of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The eNB (or base station) determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
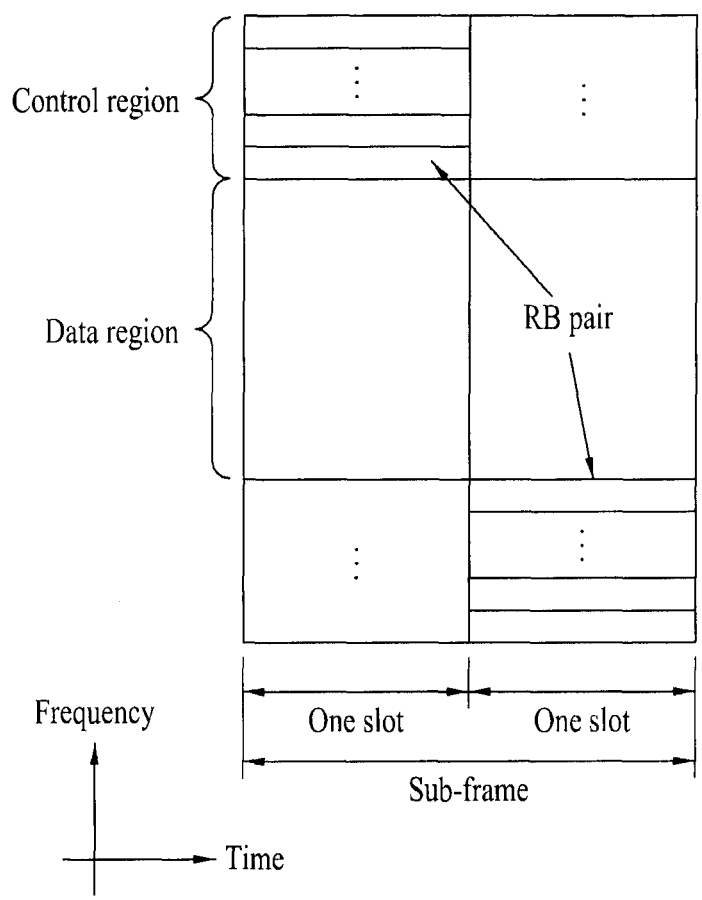
FIG. 4 is an uplink (UL) subframe structure.

FIG. 4 is a diagram showing the structure of an uplink frame. The uplink subframe may be divided into a control region and a data region in a frequency region. A Physical Uplink Control Channel (PUCCH) including uplink control information is allocated to the control region. A Physical uplink Shared Channel (PUSCH) including user data is allocated to the data region. In order to maintain single carrier characteristics, one UE does not simultaneously transmit the PUCCH and the PUSCH. The PUCCH for one UE is allocated to an RB pair in a subframe. RBs belonging to the RB pair occupy different subcarriers with respect to two slots. Thus, the RB pair allocated to the PUCCH is "frequency-hopped" at a slot edge.

Heterogeneous Deployments

Figure 5:
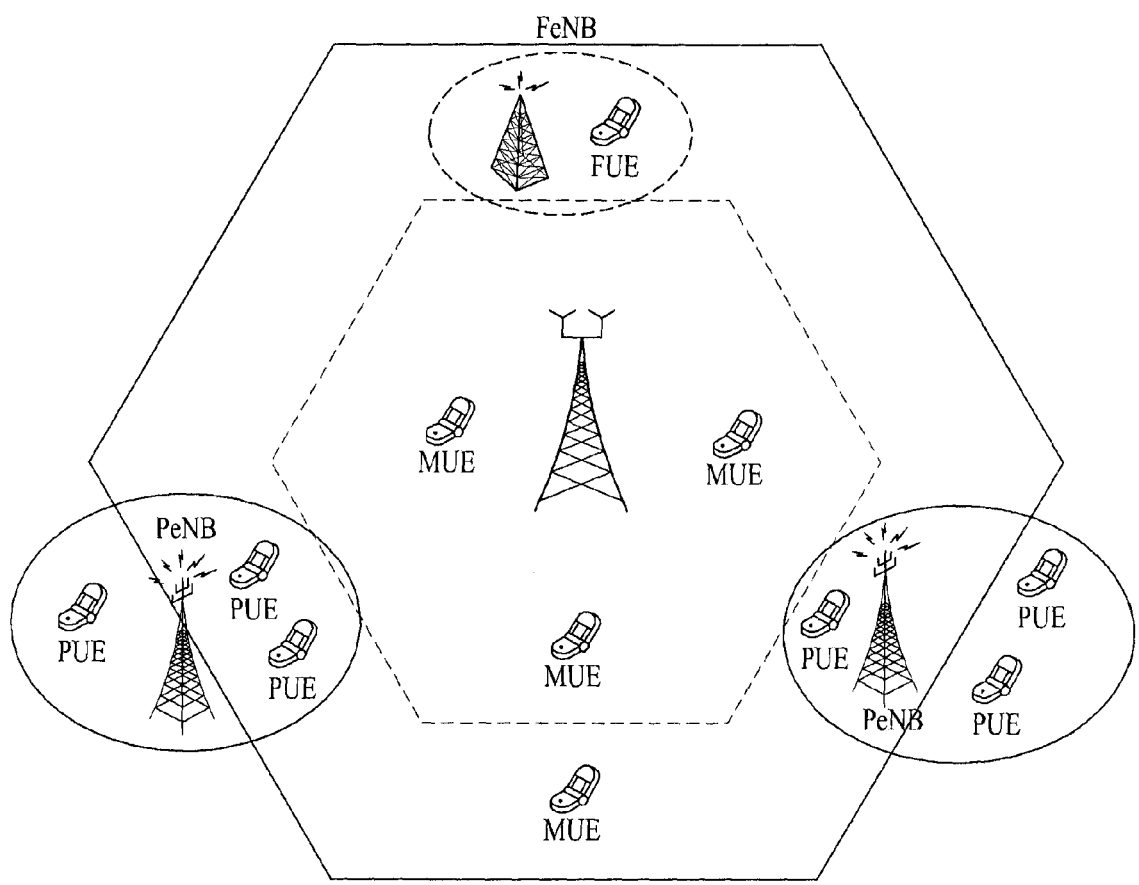
FIG. 5 shows a heterogeneous network environment (heterogeneous deployments).

FIG. 5 is a heterogeneous network wireless communication system including a macro eNB (MeNB) and a micro eNB (PeNB or FeNB). The term "heterogeneous network" refers to a network in which a macro eNB (MeNB) and a micro eNB (PeNB or FeNB) coexist even though the same Radio Access Technology (RAT) is used.

The macro eNB (MeNB) is a normal eNB having wide coverage and high transmission power in a wireless communication system. The macro eNB (MeNB) may also be referred to as a macro cell. The micro eNB (PeNB or FeNB) may also be referred to as a micro cell, a pico cell, a femto cell, a home eNB (HeNB), a relay, etc. (MeNB, PeNB and FeNB may also be generically named a transmission point as necessary). The micro eNB (PeNB or FeNB) is a small-sized version of the macro eNB (MeNB), such that the micro eNB (PeNB or FeNB) may independently perform most of the functions of the macro eNB (MeNB). The micro eNB (PeNB or FeNB) may be installed (in an overlay manner) in an area covered by the macro eNB (MeNB) or may be installed (in a non-overlay manner) in a shadow area that cannot be covered by the macro eNB (MeNB). The micro eNB (PeNB or FeNB) has a narrower coverage and lower transmission power and may accommodate a smaller number of user equipments (UEs), compared to the micro eNB (MeNB).

UE, which is hereinafter referred to as a macro UE (MUE), may be directly served by the macro eNB (MeNB). UE, which is hereinafter referred to as a micro UE (MUE), may be served by the micro eNB (PeNB or FeNB). In some cases, the UE present within the coverage of the micro eNB (MeNB) may be served by the macro eNB (MeNB).

The micro eNB (eNB) may be classified into two types according to access limitations of the UE.

The first type is a Closed Subscriber Group (CSG) or non-Closed Access Subscriber Group (non-CSG) eNB serving as a cell that allows either a legacy macro UE or another micro eNB to access a micro UE. The legacy macro UE (MUE) or the like may be handed over to an OSG-type eNB.

The second type is a CSG eNB that prevents the legacy macro UE or another micro eNB from accessing the micro UE, such that it is impossible to be handed over to the CSG eNB.

Inter-Cell Interference Coordination ICIC)

In the above-mentioned heterogeneous network environment (heterogeneous deployment), inter-cell interference (ICI) may occur. In order to solve the inter-cell interference (ICI) problem, an inter-cell interference coordination (ICIC) may be used. The legacy ICIC may be applied to a frequency resource or a time resource.

As an exemplary ICIC of the frequency resource, the 3GPP LTE Release-8 system is designed to divide an overall frequency region (for example, a system bandwidth) into one or more sub-regions (for example, a physical resource block (PRB) unit), and a predetermined scheme for exchanging ICIC messages of individual frequency sub-regions between cells is defined in the 3GPP. LTE Release-8 system. A variety of parameters may be contained in an ICIC message for frequency resources. For example, a Relative Narrowband Transmission Power (RNTP) related to downlink transmission power, uplink (UL) Interference Overhead Indication (IOI) related to uplink interference, UL High Interference Indication (HII), etc. may be defined in the ICIC message for frequency resources.

RNTP is information indicating downlink transmission power used in a specific frequency sub-region by a cell transmitting an ICIC message. For example, if an RNTP field for a specific frequency sub-region is set to a first value (for example, 0), this means that downlink transmission power of the corresponding cell does not exceed a predetermined threshold value in the corresponding frequency sub-region. Alternatively, if the RNTP field for the specific frequency sub-region is set to a second value (for example, 1), this means that the corresponding cell cannot promise downlink transmission power in the corresponding frequency sub-region. In other words, if the RNTP field is set to zero '0', this means that downlink transmission power of the corresponding cell is low in the corresponding frequency sub-region. Otherwise, if the RNTP field is set to 1, this means that downlink transmission power of the corresponding cell is not low in the corresponding frequency sub-region.

UL IOI is information indicating the amount of uplink interference experienced (or generated) in a specific frequency sub-region including a cell configured to transmit an ICIC message. For example, if an IOI field for a specific frequency sub-region has a high-interference amount, this means that the corresponding cell experiences high uplink interference in the corresponding frequency sub-region. In the frequency sub-region corresponding to an IOI indicating high uplink interference, the cell having received the ICIC message can schedule a UE that uses low uplink transmission power from among serving UEs of the cell. Therefore, since UEs perform uplink transmission at low transmission power in the frequency sub-region corresponding to an IOI indicating high uplink interference, uplink interference experienced by a neighbor cell (that is, a cell having transmitted the ICIC message) may be reduced.

UL HII indicates the degree of interference (or uplink interference sensitivity) that may be encountered in the corresponding frequency sub-region because of uplink transmission within a cell configured to transmit the ICIC message. For example, if the HII field is set to a first value (for example, 1) in a specific frequency sub-region, there is a high possibility of scheduling a high uplink transmission power UE by a cell for transmission of the ICIC message in the corresponding frequency sub-region. On the other hand, if the HII field is set to a second value (for example, 0) in a specific frequency sub-region, there is a possibility of scheduling a low uplink transmission power UE by the cell for transmission of the ICI message in the corresponding frequency sub-region. Meanwhile, if a UE is first scheduled in a frequency sub-region in which an HII is set to a second value (for example, 0) and some UEs capable of properly operating even in high interference are scheduled in another frequency sub-region in which an HII is set to a first value (for example, 1), one cell having received the ICIC message can avoid interference from another cell having transmitted the ICIC message.

On the other hand, as an exemplary ICIC of the time resource, the 3GPP LTE-A system (or 3GPP LTE Release-10) system is designed to divide an overall time region into one or more sub-regions (for example, a subframe unit) in a frequency domain, and a predetermined scheme for exchanging specific information indicating silencing or non-silencing of individual frequency sub-regions between cells is defined in the 3GPP LTE-A system. The cell having transmitted the ICIC message may transmit specific information indicating the presence of silencing in a specific subframe to neighbor cells, and does not schedule a PDSCH and a PUSCH in the corresponding subframe. On the other hand, the cell having received the ICIC message can schedule uplink transmission and/or downlink transmission for a UE on a subframe in which silencing is performed in another cell having transmitted the ICIC message.

Figure 6:
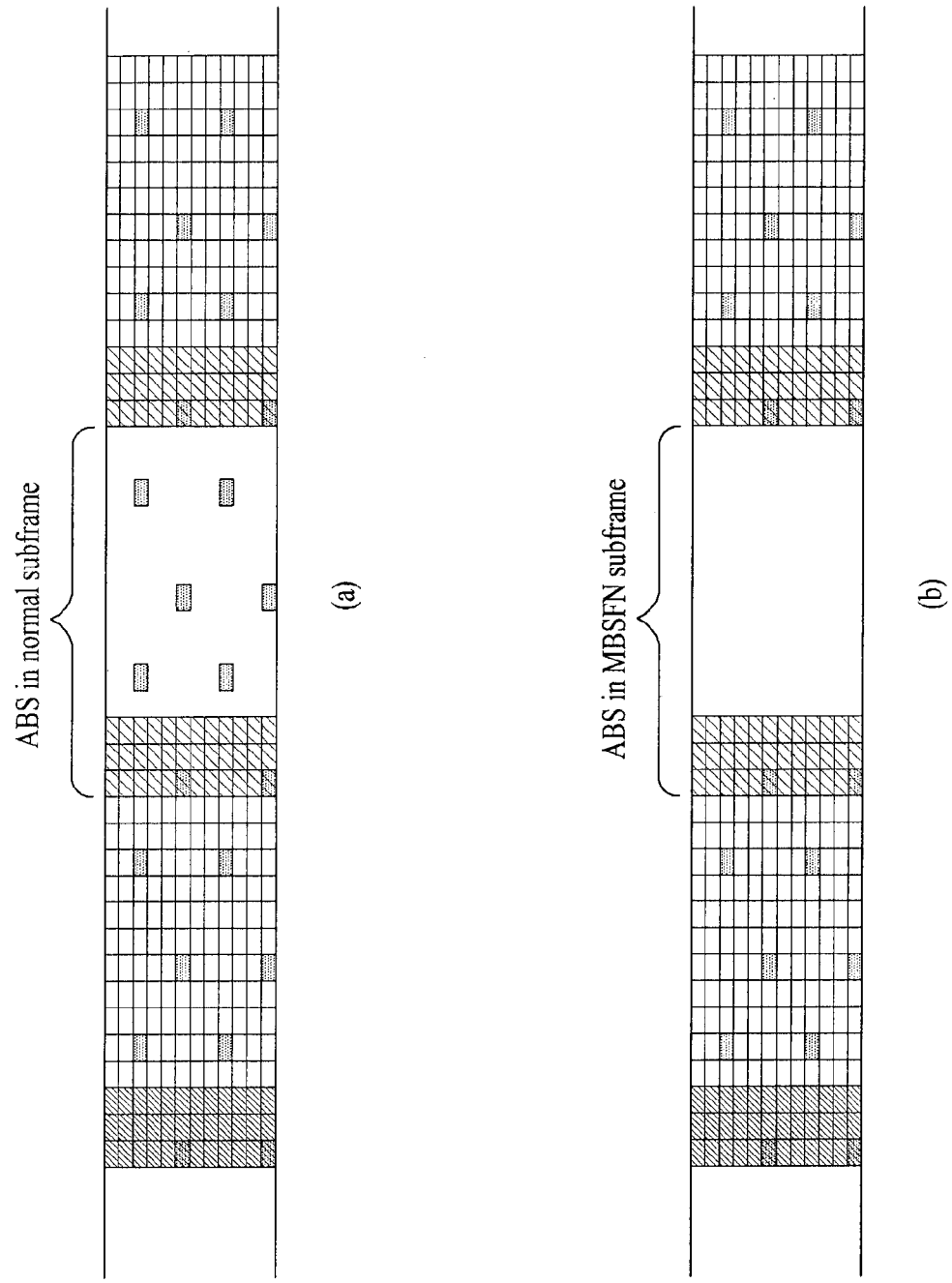
FIG. 6 is a conceptual diagram illustrating an absolute blank subframe (ABS).

Silencing may refer to an operation of a specific cell within a specific subframe. That is, the silencing operation indicates that a specific cell does not perform most of signal transmission on uplink or downlink of a specific subframe. If necessary, the silencing operation may also indicate that a specific cell can transmit signals at no power or low power on uplink and downlink of specific subframe. As an example of silencing, a specific cell may allow a specific subframe to be an Almost Blank Subframe (ABS). The ABS may be classified into two ABSs (i.e., ABS in normal subframe and ABS in MBSFN subframe) as shown in FIG. 6. In more detail, as shown in FIG. 6(a), the ABS in normal subframe indicates that a data region remains empty whereas a Cell specific Reference Signal (CRS) is transmitted, and the ABS in MBSFN subframe indicates that no CRS is transmitted. In the case of 'ABS in normal subframe', there may arise some influence of interference caused by CRS. Accordingly, although the ABS in MBSFN subframe has advantageous over the ABS in normal subframe in terms of interference, the number of usages of the ABS in MBSFN subframe is limited, such that two kinds of ABSs can be independently or collectively used as necessary.

Handover

A handover and random access process for use in the LTE system will hereinafter be described in detail.

Figure 7:
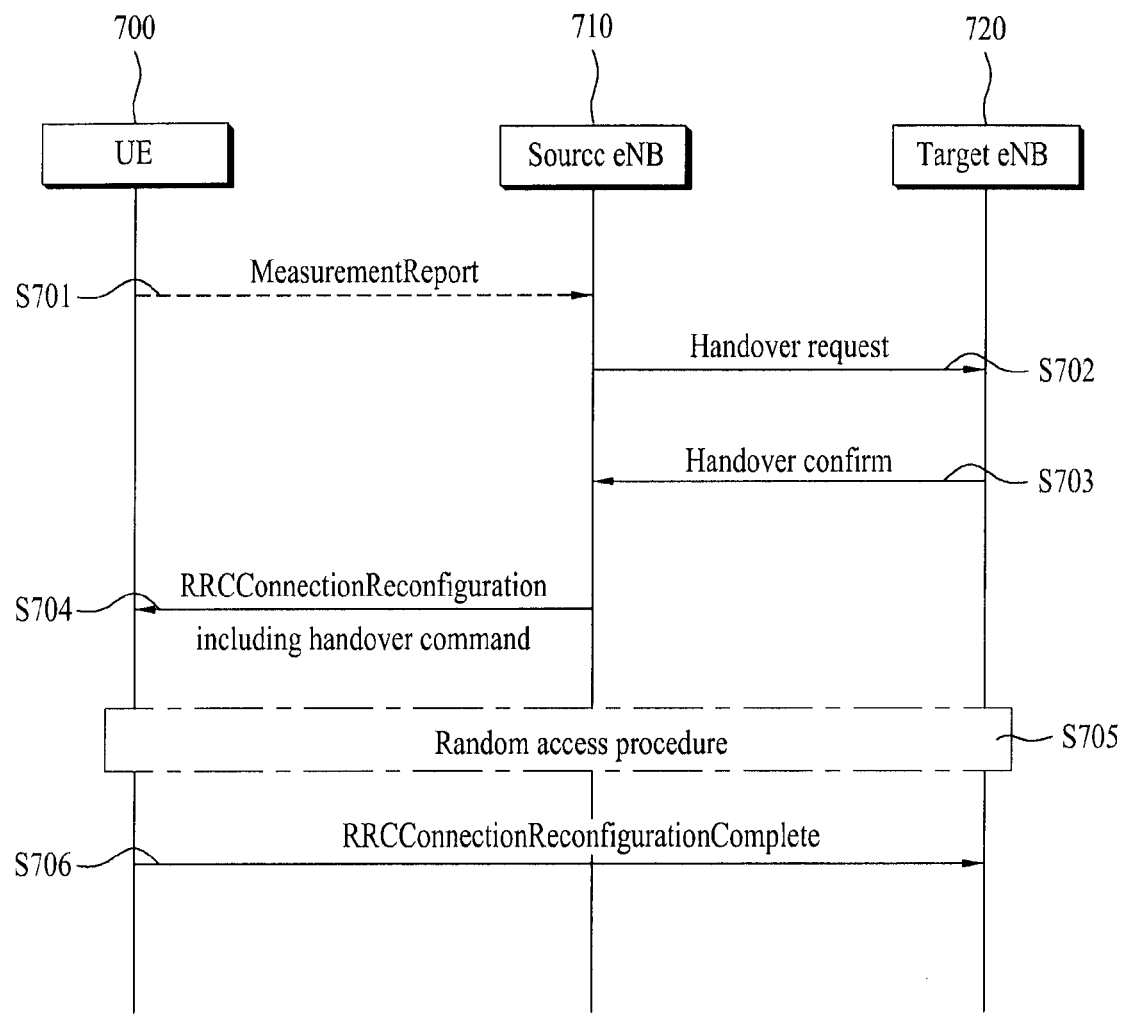
FIG. 7 is a flowchart illustrating a handover procedure.

FIG. 7 is a flowchart illustrating a handover procedure. Referring to FIG. 7, while a UE 700 monitors measurement values received not only from a serving eNB 710 currently connected to the UE 700 but also from neighbor cells, if a handover trigger occurs, the UE 700 transmits a measurement report message to the serving eNB 710 (Step S701). In this case, the measurement report may correspond to a Reference Signal Receive Power (RSRP), a Received Signal Strength Indicator (RSSI), a Reference Signal Received Quality (RSRQ), etc.

RSRP is a measurement value that is capable of being obtained by measuring the magnitude of CRS on downlink. RSSI is a total reception power value received by the corresponding UE, and is used as a measurement value including interference, noise power, etc. encountered from contiguous or neighbor cells. RSRQ is a measurement value configured in the form of N*RSRP/RSSI (where N is the number of RBs of the corresponding bandwidth obtained by RSSI measurement.

Transmission or non-transmission of a measurement report can be determined by the following event-based measurement report decision i) to v).

i) In Decision i), a measurement value of the serving cell is higher than an absolute threshold value (i.e., Serving cell becomes better than absolute threshold).

ii) In Decision ii), a measurement value of the serving cell is lower than an absolute threshold value (i.e., Serving cell becomes worse than absolute threshold).

iii) In Decision iii), a measurement value of a neighboring cell is higher than a measurement value of the serving cell by an offset value (i.e., Neighboring cell becomes better than an offset relative to the serving cell).

iv) In Decision iv), a measurement value of a neighboring cell is higher than an absolute threshold value (i.e., Neighboring cell becomes better than absolute threshold).

v) In Decision v), a measurement value of the serving cell is lower than an absolute threshold value, and a measurement value of the neighboring cell is higher than another absolute threshold value (i.e., Serving cell becomes worse than one absolute threshold and Neighboring cell becomes better than another absolute threshold)

In Decision (i)~(v), the measurement value may be an RSRP, etc.

In addition, a measurement report may be transmitted only when each condition for the above-mentioned measurement report decision is maintained in at least a predetermined time established in a network.

Figure 8:
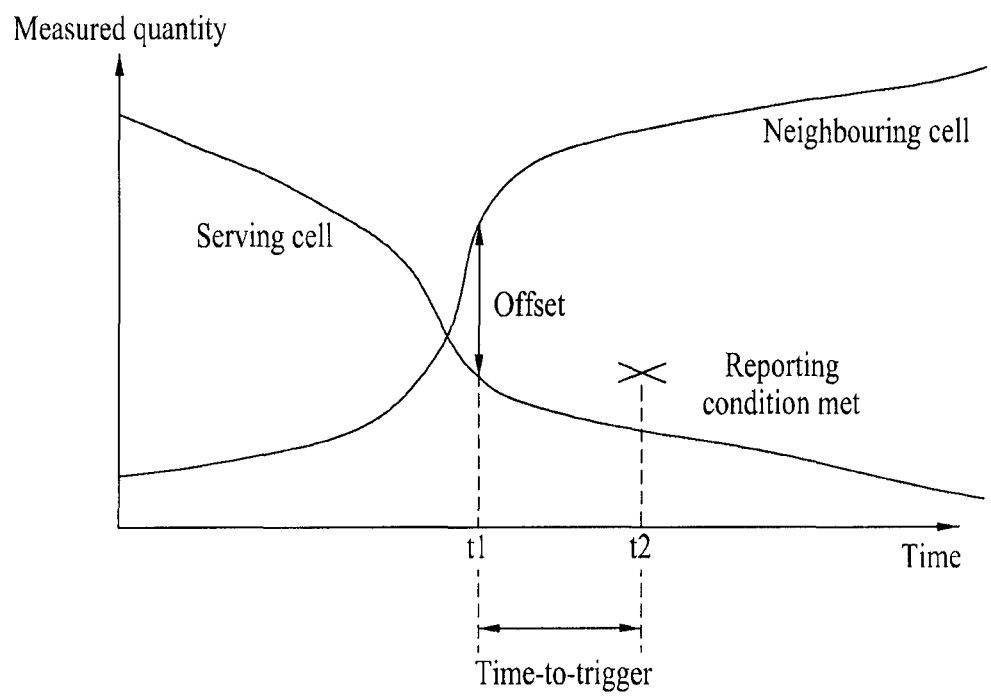
FIG. 8 is a conceptual diagram illustrating a method for determining transmission or non-transmission of a measurement report in a handover procedure.

Decision (iii) from among the above-mentioned measurement report decision references will hereinafter be described with reference to FIG. 8. A user equipment (UE) can persistently measure an RSRP, etc. of the serving cell and the neighbor cell. As the UE continuously approaches the neighbor cell, if a predetermined time (time-to-trigger) elapses from a specific time (t1) at which an RSRP of the neighbor cell is higher than an RSRP of the serving cell by an offset and then reaches a time (t2), the UE can perform a measurement report for the serving cell. In this case, the offset value, the predetermined time, etc. can be established by a network.

Subsequently, the serving eNB 710 having received the measurement report from the UE 700 transmits a handover request to the target eNB 720 (Step S702). In this case, the serving eNB 710 provides radio resource control (RRC) context information of the UE 700 to the target eNB 720.

The target eNB 720 determines whether the UE is handed over on the basis of the RRC context information. If the handover is determined, the target eNB 720 generates a handover command, and the serving eNB 710 transmits an RRC connection reconfiguration (RRCConnectionReconfiguration) message including a handover command to the UE 700 (Step S704). The RRCConnectionReconfiguration message may include radio resource configuration information, security configuration, cell-RNTI (C-RNTI), etc. commonly applied to UEs covered by the target eNB 720.

Upon receiving the RRCConnectionReconfiguration message, the UE 700 initiates a random access procedure to the target eNB 720 (Step S705). If the random access procedure has been successfully completed, the UE 700 transmits an RRC connection reconfiguration complete (RRCConnectionReconfigurationComplete) message to the target eNB 720, such that a handover procedure is completed (Step S706).

The random access procedure from among the handover procedure will hereinafter be described. A UE for use in the LTE system can perform the random access procedure according to the following cases 1) to 5).

1) If a UE performs initial access without RRC connection to an eNB, the UE can perform the random access procedure.

2) If a UE performs initial access to the target cell in a handover procedure, the UE can perform the random access procedure.

3) If a random access procedure is requested by a command of the eNB, the random access procedure can be performed.

4) If uplink time synchronization is improper, or if data for uplink occurs under the condition that predetermined radio resources used for requesting a radio resource are not allocated, the random access procedure can be performed.

5) In the case of a recovery procedure under a radio link failure or a handover failure, the random access procedure can be performed.

A general contention-based random access procedure will hereinafter be described.

Figure 9:
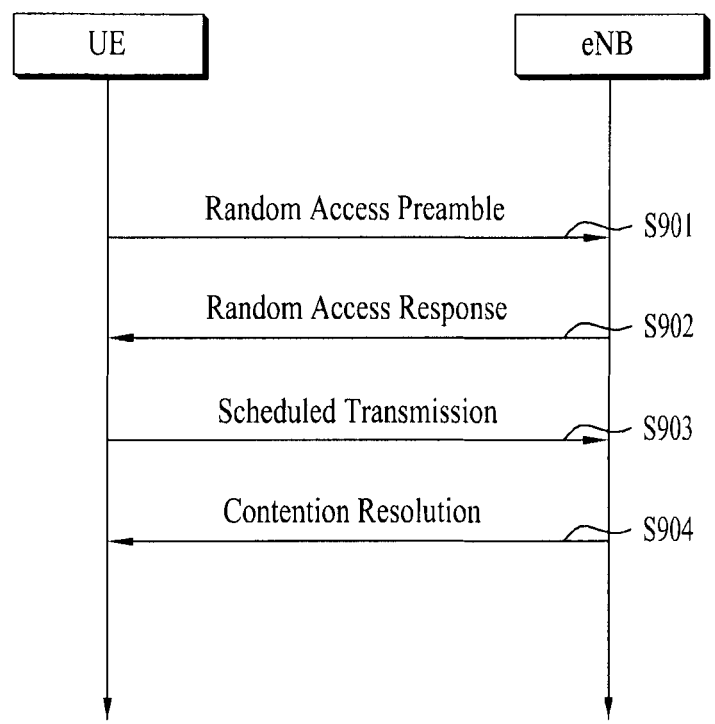
FIG. 9 is a flowchart illustrating a random access procedure.

FIG. 9 is a flowchart illustrating UE and eNB operations for use in a contention-based random access procedure.

(1) Transmission of First Message

First, a EU randomly selects one random access preamble from an aggregate of the random access preambles indicated either through system information or through a handover command, and selects/transmits a Physical RACH (PRACH) capable of transmitting the random access preamble (Step S901).

(2) Reception of Second Message

After transmitting the random access preamble, the eNB (or BS) attempts to receive its own random access response within a random access response reception window indicated either by the system information or by a handover command (Step S902).

In more detail, the random access response information can be transmitted in the form of MAC PDU, and MAC PDU can be transmitted through a Physical Downlink Shared Channel (PDSCH). In addition, in order to enable the UE to properly receive information transmitted through PDSCH, the UE may preferably monitor a PDCCH. That is, PDCCH may preferably include information of a UE that has to receive the PDSCH, frequency and time information of PDSCH radio resources, PDSCH transmission type, etc. Upon receiving a PDCCH, the UE can properly receive a random access response transmitted through a PDSCH according to the above-mentioned PDCCH information. The random access response may include a random access preamble identifier (RAPID), a UL grant indicating uplink radio resources, a temporary C-RNTI, and Timing Advance Command (TAC), etc.

The reason why the RAPID is needed for the random access response is as follows. One random access response may include random access response information for one or more UEs, such that it is necessary to indicate specific information as to which one of UEs can effectively use UL grant, temporary C-RNTI, and TAC. It is assumed that the UE selects a random access preamble ID (RAPID) identical to a random access preamble that has been selected by the UE at step S902. As a result, the UE can receive a UL grant, a Temporary C-RNTI, a Timing Advance Command (TAC), etc.

(3) Transmission of Third Message

If a UE has received a valid random access response, the UE processes information contained in the random access response. That is, the UE applies a TAC, and stores a temporary cell ID (temporary C-RNTI). In addition, the UE may store data to be transmitted in response to the valid random access response, and store the data in a message-3 buffer.

On the other hand, the UE transmits data (i.e., a third message) to the eNB using the received UL acknowledgement (Step S903). The third message must include an ID of the UE. In accordance with the contention-based random access procedure, the eNB cannot determine which UE can perform the random access procedure, and must identify a UE so as to perform contention resolution in the future.

Two methods for including a UE ID have been discussed. In accordance with a first method, if the UE includes a valid cell ID assigned from the corresponding cell prior to the random access procedure, the UE transmits its own cell ID through an uplink transmission signal corresponding to UL acknowledgement. On the other hand, if a valid cell ID is not assigned to the UE prior to the random access procedure, the UE includes its own unique ID (for example, S-TMSI or random ID) in a signal to be transmitted, and transmits the resultant signal. Generally, the unique ID is longer than the cell ID. Provided that the UE transmits data corresponding to the UL acknowledgement, a contention resolution timer (hereinafter referred to as a CR timer) starts operating.

(4) Reception of Fourth Message

After the UE has transmitted data including its own ID through UL acknowledgement contained in the random access response, the UE waits for receiving an indication message from the eNB so as to perform contention resolution. That is, the UE attempts to receive a PDCCH so as to receive a specific message (Step S904). Two methods for receiving the PDCCH have been discussed. As described above, if a third message transmitted in response to the UL acknowledgement is transmitted using a cell ID, the UE attempts to receive a PDCCH using its own cell ID. If the UE ID is a unique ID, the UE can attempt to receive a PDCCH using a temporary C-RNTI contained in the random access response. Thereafter, in the former case, if the UE receives a PDCCH through its own cell ID prior to the contention resolution (CR) timer prior to the expiration of the contention resolution (CR) timer, the UE determines that a random access procedure has been normally executed, and completes the random access procedure. In the latter case, if the CR timer receives a PDCCH through a temporary C-RNTI before the expiration of the contention resolution timer, the UE confirms data transmitted through a PDSCH indicated by the PDCCH. If a unique ID of the UE is contained in content of the data, the UE determines that a random access procedure has been normally performed, such that it completes the random access procedure.

On the other hand, a non-contention-based random access procedure is completed only through transmission of first and messages, differently from the contention-based random access procedure shown in FIG. 9. Before the UE transmits a random access preamble to the eNB using the first message, the UE receives a random access preamble from the eNB. The UE transmits the received random access preamble to the eNB using the first message, receives a random access response from the eNB, and completes the random access procedure.

Cell Range Extension (CRE)

Cell Range Extension (CRE) indicates that UEs, that are located in the vicinity of a micro eNB (e.g., PeNB) and receive interference from the micro eNB (e.g., PeNB), from among MUEs connected to a macro eNB (e.g., MeNB) under the heterogeneous network environment are handed over to the micro eNB (e.g., PeNB). Influence of the legacy interference can be reduced through such CRE execution, and the load balancing effect can be achieved.

Figure 10:
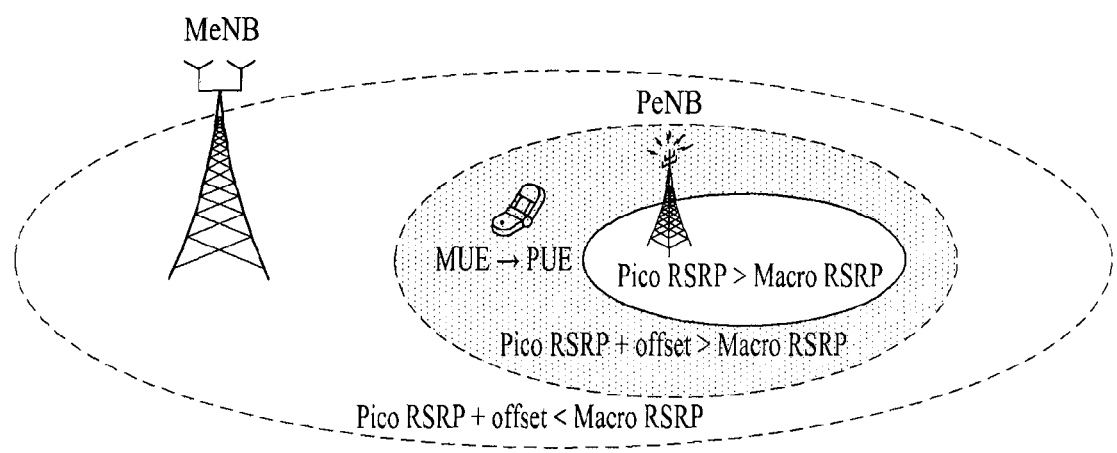
FIG. 10 is a conceptual diagram illustrating a method for determining transmission or non-transmission of a measurement report in a heterogeneous network environment.

Due to characteristics of the heterogeneous network environments (hereinafter deployments), there is a high possibility that a measurement value (such as RSRP) of the macro eNB (MeNB) is higher than an RSRP of the micro eNB (PeNB or FeNB), because the micro eNB (FeNB or PeNB) generally transmits data at low power. Accordingly, when the UE performs CRE, Decision iii) from among the above-mentioned measurement report transmission decisions can be used, wherein the Decision iii) is denoted by "Neighboring cell becomes better than an offset relative to the serving cell". FIG. 10 shows an example of heterogeneous network environments (hereinafter deployments) to which the above-mentioned decision is applied. In FIG. 10, a UE belonging to a shadow part satisfies a measurement report transmission decision reference, and transmits a measurement report to the macro eNB acting as the serving eNB, such that it can initiate the handover procedure.

However, the above-mentioned CRE can determine whether the measurement report is transmitted (i.e., whether a handover procedure starts) on the basis of a measurement value such as RSRP in consideration of downlink. As described above, ICIC considers not only downlink interference (for example, the UE covered by the macro eNB receives interference from the micro eNB) but also uplink interference (for example, the UE configured to transmit an uplink signal to the micro eNB gives interference to the micro eNB), such that it is necessary for the CRE to consider uplink interference.

For example, if a UE covered by the macro eNB is severely interfered from the micro eNB on downlink, or if the UE severely interferes with the micro eNB on uplink, it is the most preferable that the UE be handed over to the micro eNB using the above-mentioned measurement report transmission decision iii) or the like. The micro eNB reduces downlink interference of the UE covered by the macro eNB using ABS or the like. Provided that the UE does not give high interference to the micro eNB because it does not use high transmission power on uplink, if the UE is handed over to the micro eNB according to a decision reference considering only downlink, a Quality of Service (QoS) of the UE capable of receiving a stable service from the macro eNB may be deteriorated.

Therefore, the embodiments of the present invention provide a variety of decision references for a measurement report in consideration of uplink interference. As a decision reference for determining whether the above-mentioned measurement report is transmitted, if a measurement value of the neighboring cell is higher than a measurement value of the serving cell by an offset value according to the above-mentioned decision (iii) denoted by "Neighboring cell becomes better than an offset relative to the serving cell", the following measurement report decision reference will hereinafter be described using Equation 1 as an example for convenience of description, the scope or spirit of the measurement report decision references is not limited thereto, and can also be applied to other exemplary decision references. Although RSRP is applied to Decision (iii) as shown in Equation 1, it should be noted that RSSI, RSRQ, etc. can also be used as necessary.

$$RSRP_{TP1} < RSRP_{TP2} + \text{offset} \quad [\text{Equation 1}]$$

In Equation 1, $RSRP_{TP1}$ is a reference signal received power from a first transmission point, $RSRP_{TP2}$ is a reference signal received power from a second transmission point, and offset an offset value. The offset value offset may be determined by higher layer signaling, and can extend the cell region of the second transmission point.

In the following description, the macro eNB is referred to as a first transmission point, and the micro eNB is referred to as a second transmission point.

Embodiment 1

Figure 11:
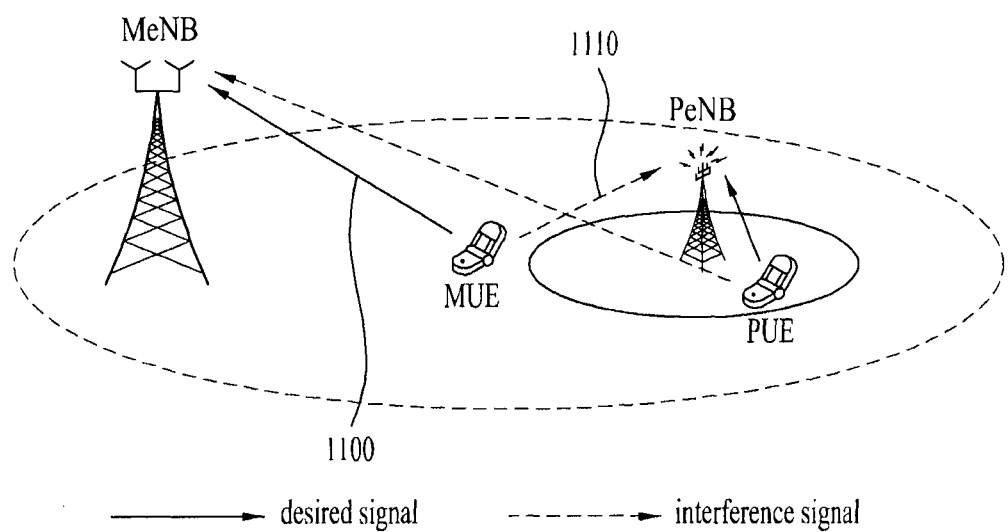
FIG. 11 is a conceptual diagram illustrating uplink interference in a heterogeneous network environment.

FIG. 11 is a conceptual diagram illustrating uplink interference in a heterogeneous network environment. Referring to FIG. 11, a macro UE (MUE, hereinafter referred to as a UE) is served by a first transmission point, and is located adjacent to a cell region of the second transmission point. Under the above-mentioned environment, the UE transmits a PUCCH and/or a PUSCH to a first transmission point (Step 1100), and such UL transmission 1110 can be used as interference (1110) for the second transmission point, because the first transmission point and the second transmission point share radio resources.

Under the environment such as FIG. 11, interference applied from the UE to the second transmission point is determined according to the magnitude of UL transmission power of the UE. Accordingly, the first embodiment (Embodiment 1) proposes a measurement report transmission decision reference that simultaneously considers not only a measurement report transmission decision reference considering a legacy downlink, but also a value related to uplink transmission power. In this case, the value related to UL transmission power may be set to at least one of parameters used for transmission power for PUCCH and/or PUSCH transmission of the UE. Therefore, in order to confirm such parameters, uplink power control for use in the legacy LTE/LTE-A system will first be described, and a measurement report transmission decision reference for Embodiment 1 will then be described.

UL power control is applied to the LTE/LTE-A system such that the LTE/LTE-A system can easily demodulate uplink control information, data, etc. UL power control can be classified into PUCCH power control, PUSCH power control, UL Sounding Reference Signal (SRS) power control.

PUCCH power control is determined considering the path loss, maximum transmission power of the UE, etc., such that control information transmitted through PUCCH can be demodulated at a sufficiently low error rate.

In more detail, PUCCH power control at the subframe (i) of the cell (c) may be represented by the following equation 2.

$$P_{PUCCH}(i) = \min \begin{Bmatrix} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{Bmatrix} [dBm] \qquad \text{[Equation 2]}$$

Subsequently, PUSCH power control under the condition that PUCCH transmission is not performed can be represented by the following equation 3.

$$P_{PUSCH,c}(i) = \min \begin{Bmatrix} P_{CMAX,c}(i), \\ 10\log_{10}(M_{PUSCH,c}(i)) + P_{0\_PUSCH,c}(j) + \alpha_c(j) \cdot PL_c + \Delta_{TF,c}(i) + f_c(i) \end{Bmatrix} [dBm] \qquad \text{[Equation 3]}$$

In Equation 2, $P_{MAX,c}(i)$ is maximum transmission power of the UE, and is used as the upper limit of the PUCCH power control command.

$P_{0\_PUCCH}$ is a desired PUCCH transmission power value to be received by the eNB. $P_{0\_PUCCH}$ acting as a UE-specific parameter is transmitted through higher layer signaling, and is determined to be the sum of $P_{O\_NOMINAL\_PUCCH}$ acting as a nominal power value and $P_{O\_UE\_PUCCH}$.

$PL_c$ is a pathloss value at the cell c, and is estimated by the UE. $PL_c$ can be estimated by the UE on the condition that reception power of a cell-specific reference signal (CRS) is measured.

$h(n_{CQI}, n_{HARQ}, n_{SR})$ is dependent upon a PUCCH format, $n_{CQI}$ is the number of bits indicating channel quality information, $n_{HARQ}$ is the number of HARQ bits. If the subframe (i) is established for scheduling request, $n_{SR}$ is set to 1. Otherwise, $n_{SR}$ is set to 0. $h(n_{CQI}, n_{HARQ}, n_{SR})$ is dependent upon the PUCCH format. In more detail, in the case of PUCCH format 1, 1a, or 1b, $h(n_{CQI}, n_{HARQ}, n_{SR})$ is set to 0. If one or more serving cells are used in PUCCH format 1b, $h(n_{CQI}, n_{HARQ}, n_{SR})$ is set to $$\frac{(n_{HARQ} - 1)}{2}.$$

If general cyclic prefix (CP) is used in PUCCH format 2, 2a or 2b, $h(n_{CQI}, n_{HARQ}, n_{SR})$ is set to $$10\log_{10}\left(\frac{n_{CQI}}{4}\right).$$

$\Delta_{F\_PUCCH}(F)$ is signaled from a higher layer in consideration of MCS. In more detail, $\Delta_{F\_PUCCH}(F)$ indicates the necessity of signal-to-noise interference ratio (SINR) in response to not only the number of bits per subframe of the PUCCH format but also different error rates.

$\Delta_{TxD}(F')$ is a power offset signaled from a higher layer when PUCCH is transmitted using two antenna ports, and is dependent upon the PUCCH format.

g(i) is an accumulation value of the current PUCCH power control adjustment states, and is determined not only by a power value $\delta_{PUCCH}$ corresponding to a transmit power control (TPC) command field value contained in a DCI format transmitted through a PDCCH, but also by a PUCCH power control adjustment state value g(i−1) of a previous subframe.

$P_{CMAX,c}(i)$ is maximum transmission power of the UE, and $M_{PUSCH,c}(i)$ is a PUSCH transmission bandwidth denoted by the number of RBs.

$P_{O\_PUSCH,c}(j)$ is a desired PUSCH transmission power value to be received by the eNB. $P_{O\_PUSCH,c}(j)$ is determined to be the sum of $P_{O\_NOMINAL\_PUCCH}$ acting as a nominal power value and $P_{O\_UE\_PUCCH}$. In the case of semi-persistent scheduling, j is set to 0 (j=0). In the case of dynamic scheduling, j is set to 1 (j=1). In the case of a random access response, j is set to 2 (j=2).

$\alpha_c(j) \cdot PL_c$ is a downlink pathloss, where $PL_c$ is estimated by the UE, and $\alpha_c(j)$ is a pathloss compensation value transmitted through higher layer signaling. In the case of j=0 or j=1, $\alpha_c \in \{0, 0.4, 0.5, 0.6, 0.7, 0.8, 0.9, 1\}$ is achieved. In the case of j=1, $\alpha_c(j)$ is set to 1 ($\alpha_c(j)$=1).

$\Delta_{TF,c}(i)$ is calculated not only using a value transmitted through higher layer signaling, but also using BPRE (Bit Per Resource Element), CQI, PMI, etc. $f_c(i)$ is an accumulation value. $f_c(i)$ is determined by various parameters, for example, a power value $\delta_{PUCCH}$ corresponding to a TPC command field value contained in a DCI format transmitted on PDCCH, a value of $K_{PUSCH}$ depending upon setting values such as FDD, TDD, etc., and an accumulation value $f_c(i-1)$ extended to a previous subframe.

If PUCCH transmission is performed along with PUSCH transmission, PUSCH power control is represented by the following equation 4.

$$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{0\_PUSCH,c}(j) + \alpha_c(j) \cdot PL_c + \Delta_{TF,c}(i) + f_c(i) \end{Bmatrix} [dBm] \qquad \text{[Equation 4]}$$

$\hat{P}_{CMAX,c}(i)$ is a linear value for the value $P_{CMAX,c}(i)$, and $\hat{P}PUCCH(i)$ is a linear value for PUCCH power control decided by Equation 2. The remaining parameters have already been disclosed and as such a detailed description thereof will be omitted herein for convenience of description.

As described above, in order to implement uplink power control, the LTE/LTE-A system may use i) parameters ($PL_c$, $\alpha_c(j)$) related to pathloss, may use ii) parameters ($P_{0\_PUCCH}$, $P_{0\_PUSCH,c}(i)$) related to a desired reception signal power, may use iii) power offset values ($\Delta_{TF,c}(i)$, $\Delta_{TxD}(F')$), and may use iv) parameters (g(i), $f_c(i)$) related to the accumulation value. In accordance with Embodiment 1, at least one of the above-mentioned parameters is contained in Equation 1, such that a measurement report transmission decision considering uplink interference and downlink interference may be used. Specifically, the following equation 5 in which $\alpha_c(j)$ acting as a pathloss-related parameter from among the above-mentioned parameters is applied to Equation 1 can exemplarily be used as a measurement report decision reference.

$$RSRP_{TP1}+10\log_{10}\alpha_c(j)<RSRP_{TP2}+\text{offset} \quad \text{[Equation 5]}$$

In Equation 5, $RSRP_{TP1}$ is a reference signal received power (RSRP) from a first transmission point corresponding to the first reception power, $RSRP_{TP2}$ is a reference signal reception power (RSRP) from the second transmission point corresponding to the second reception power, offset is an offset value, $\alpha_c(j)$ is a pathloss compensation value related to the UL transmission power. In the case of j=0 or j=1, $\alpha_c \in \{0, 0.4, 0.5, 0.6, 0.7, 0.8, 0.9, 1\}$ or j=1, is achieved. In the case of j=1, $\alpha_c(j)$ is set to 1 ($\alpha_c(j)$=1). j is determined according to the types of UL scheduling. In the case of semi-persistent scheduling, j is set to 0 (j=0). In the case of dynamic scheduling, j is set to 1 (j=1). In the case of a random access response, j is set to (j=2).

If Equation 5 is used as the measurement report transmission decision reference, that is, if Equation 5 is used as an initiation reference of the handover procedure, although RSRP from the first transmission point is lower than a predetermined value, if the UE does not maximally compensate for the pathloss encountered during the actual uplink transmission and a small amount of interference affects the second transmission point, the UE is not handed over to the second transmission point. In other words, only the UE causing a large amount of actual uplink interference can be handed over to the second transmission point using Equation 5, such that UE QoS can be guaranteed and UE interference can also be reduced.

Embodiment 2

Under the condition that the measurement report transmission decision reference shown in Equation 1 is satisfied, a method for adding a blocking decision reference for optimization of an uplink interference situation is disclosed.

In more detail, provided that Equation 1 is satisfied in a heterogeneous network environment (heterogeneous deployment) and the following equation 6 is also satisfied, the UE may be configured not to perform measurement report. Equation 1 can also be represented by another equation 1.

$$RSRP_{TP1}<RSRP_{TP2}+\text{offset} \quad \text{[Equation 1]}$$

The blocking decision reference can be represented by the following equation 6.

$$P_{PUSCH,c}(i)\times PL_{TP2}<\text{offset} \quad \text{[Equation 6]}$$

$RSRP_{TP2}$ is a reference signal received power from a first transmission point, $RSRP_{TP2}$ is a reference signal reception power from a second transmission point, offset is an offset value, $P_{PUSCH,c}(i)$ is a transmission power of a PUSCH at the i-th subframe, and $PL_{TP2}$ s a downlink pathloss from the second transmission point. $P_{PUSCH,c}(i)\times PL_{TP2}$ may be understood as the amount of uplink interference of the second transmission point of the UE.

In more detail, according to the embodiment 2 of the present invention, if the sum of an RSRP from the second transmission point and an offset value is higher than the RSRP from the first transmission point, and at the same time if $P_{PUSCH,c}(i)\times PL_{TP2}$ related to uplink transmission power is lower than an offset value, the UE may not transmit the measurement report. In other words, in the above-mentioned cases, CRE is dropped.

By means of Equation 1 and Equation 6, a UE that causes a large amount of uplink interference reduces uplink interference through CRE. If the large amount of uplink interference does not occur, CRE is dropped, resulting in an increase in system throughput.

Embodiment 3

Embodiment 3 is implemented as a combination of the above-mentioned embodiments. That is, a measurement report transmission decision reference considering UL interference is used in Embodiment 1, and the blocking decision reference of Embodiment 2 for optimization of UL interference situation is used.

If the following equation 7 is satisfied in Embodiment 3, CRE is performed at the second transmission point. In addition, if Equation 8 is satisfied, CRE execution can be dropped.

$$RSRP_{TP1}+10\log_{10}\alpha_c(j)<RSRP_{TP2}+\text{offset} \quad \text{[Equation 7]}$$

$$P_{PUSCH,c}(i)\times PL_{TP2}<\text{offset} \quad \text{[Equation 8]}$$

In Equations 7 and 8, individual variables have already been described, and as such a detailed description thereof will be omitted herein for the convenience of description. In addition, a different value such as RSSI may be used instead of RSRP, and at least one of $\alpha_c(j)$, $PL_{TP2}$ and/or $P_{PUSCH,c}(i)$, related to UL transmission power, may also be replaced with a parameter for deciding another UL transmission power as necessary.

Figure 12:
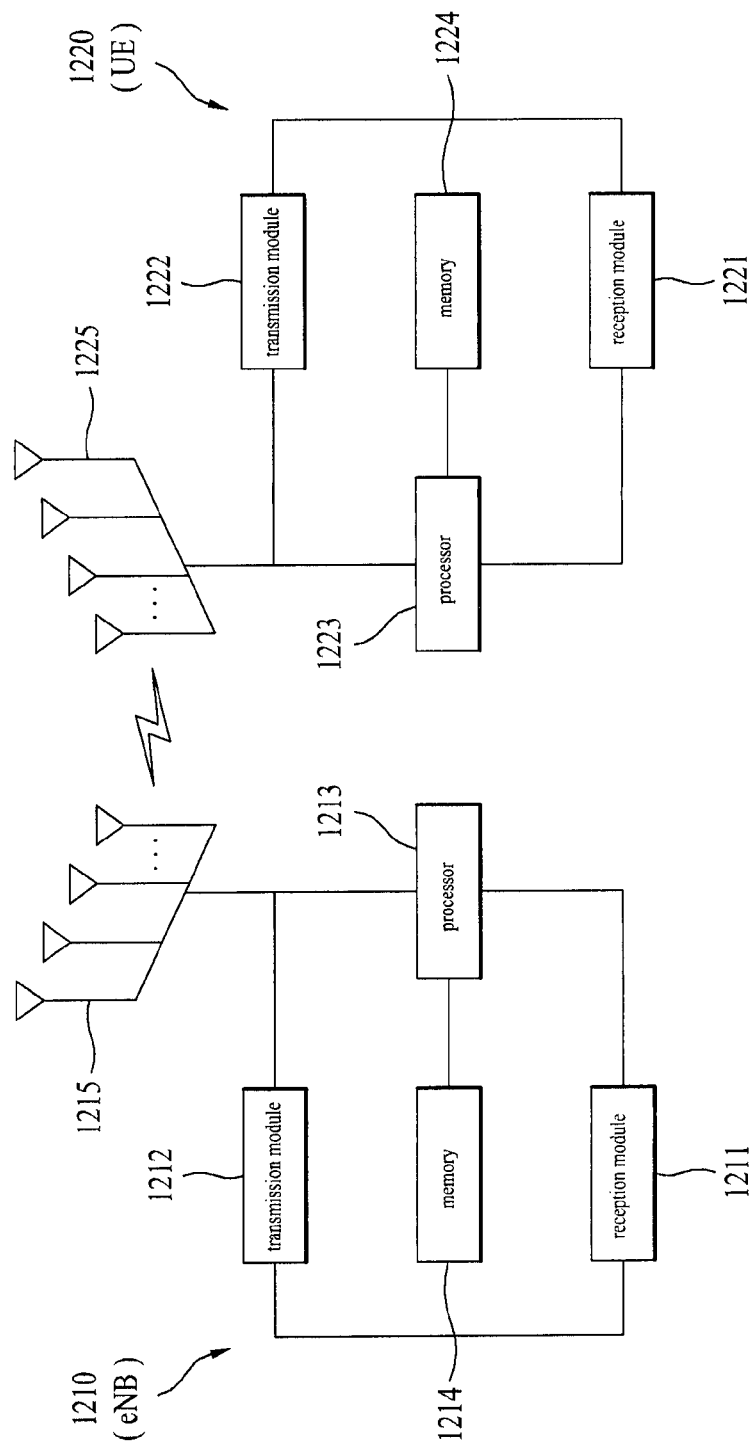
FIG. 12 is a block diagram illustrating a transceiver including a transmitter and a receiver.

FIG. 12 is a block diagram illustrating a transmission point apparatus and a UE apparatus according to an embodiment of the present invention.

Referring to FIG. 12, the transmission point apparatus 1210 according to the present invention may include a reception (Rx) module 1211, a transmission (Tx) module 1212, a processor 1213, a memory 1214, and a plurality of antennas 1215. The plurality of antennas 1215 indicates a transmission point apparatus for supporting MIMO transmission and reception. The reception (Rx) module 1211 may receive a variety of signals, data and information on an uplink starting from either the UE or the RN. The Tx module 1212 may transmit a variety of signals, data and information on a downlink for the UE. The processor 1213 may provide overall control to the transmission point apparatus 1210.

The processor 1213 of the transmission point apparatus 1210 according to one embodiment of the present invention receives a measurement report from the UE, and requests a UE handover to a second transmission point acting as another transmission point apparatus. If an acknowledgement message for the above request is received from the second transmission point, a handover command is transmitted to the UE. Transmission of the measurement report may be determined using various parameters, i.e., a first reception power from the above-mentioned transmission point apparatus, a second reception power from the second transmission point, an offset value, and a value related to UL transmission power of the UE.

The processor 1213 of the transmission point apparatus 1210 processes information received at the transmission point apparatus 1210 and transmission information to be transmitted externally. The memory 1214 may store the processed information for a predetermined time. The memory 1214 may be replaced with a component such as a buffer (not shown).

Referring to FIG. 12, the UE apparatus 1220 may include an Rx module 1221, a Tx module 1222, a processor 1223, a memory 1224, and a plurality of antennas 1225. The plurality of antennas 2225 indicates a UE apparatus for supporting MIMO transmission and reception. The Rx module 1221 may receive downlink signals, data and information from the eNB.

The Tx module 1222 may transmit uplink signals, data and information to the eNB. The processor 1223 may provide overall control to the UE apparatus 1220.

The processor 1223 of the UE apparatus 1220 according to one embodiment of the present invention measures a first reception power from the first transmission point and a second reception power from the second transmission point, and determines transmission of a measurement report for a handover to the second transmission point. In this case, transmission of the measurement report may be determined using the first reception power, the second reception power, the offset value, and values related to the UE UL transmission power.

Besides, the processor 1223 of the UE apparatus 1220 processes information received at the UE apparatus 1220 and transmission information to be transmitted externally. The memory 1224 may store the processed information for a predetermined time. The memory 1224 may be replaced with a component such as a buffer (not shown).

The specific configurations of the transmission point apparatus and the UE apparatus may be implemented such that the various embodiments of the present invention are performed independently or two or more embodiments of the present invention are performed simultaneously. Redundant matters will not be described herein for clarity.

The description of the transmission point apparatus 1210 shown in FIG. 12 may be applied to the eNB (BS), or may also be applied to a relay node (RN) acting as a DL transmission entity or UL reception entity without departing from the scope or spirit of the present invention. In addition, the description of the UE apparatus 1210 shown in FIG. 12 may be applied to the UE, or may also be applied to a relay node (RN) acting as a UL transmission entity or DL reception entity without departing from the scope or spirit of the present invention.

The above-described embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

MODE FOR INVENTION

Various embodiments have been described in the best mode for carrying out the invention.

INDUSTRIAL APPLICABILITY

The embodiments of the present invention can be applied to a variety of mobile communication systems.

The invention claimed is:

1. A method for performing a handover of a user equipment (UE) in a wireless communication system, the method comprising:
measuring a first reception power from a first transmission point and a second reception power from a second transmission point; and
determining transmission of a measurement report for the handover to the second transmission point,
wherein the transmission of the measurement report is determined using the first reception power, the second reception power, an offset value, and a value related to uplink transmission power of the user equipment (UE).

2. The method according to claim 1, wherein the value related to the uplink transmission power is at least one of parameters used for determining a transmission power for physical uplink shared channel (PUSCH) transmission or physical uplink control channel (PUCCH) transmission.

3. The method according to claim 2, wherein the value related to the uplink transmission power is a downlink pathloss compensation value.

4. The method according to claim 1, wherein:
if the sum of the second reception power and the offset value is higher than the sum of the first reception power and the value related to the uplink transmission power, the user equipment (UE) transmits the measurement report.

5. The method according to claim 1, wherein:
if an equation $RSRP_{TP1} + 10\log_{10} \alpha_c(j) < RSRP_{TP2} + \text{offset}$ is satisfied, the user equipment (UE) transmits the measurement report,
where $RSRP_{TP1}$ is a Reference Signal Received Power (RSRP) from the first transmission point corresponding to the first reception power, $RSRP_{TP2}$ is a Reference Signal Received Power (RSRP) from the second transmission point corresponding to the second reception power, offset the offset value, $\alpha_c(j)$ is a pathloss compensation value corresponding to the value related to the uplink transmission power, and j is determined according to uplink scheduling types.

6. The method according to claim 1, wherein the value related to the uplink transmission power is determined by a product of a transmission power of a physical uplink shared channel (PUSCH) and a pathloss value from the second transmission point.

7. The method according to claim 1, wherein:
if the sum of the second reception power and the offset value is higher than the first reception power and the value related to the uplink transmission power is lower than the offset value, the user equipment (UE) does not transmit the measurement report.

8. The method according to claim 7, wherein:
if equations $RSRP_{TP1} < RSRP_{TP2} + offset$ and $P_{PUSCH,c}(i) \times PL_{TP2} < offset$ are satisfied, the user equipment (UE) transmits the measurement report,
where $RSRP_{TP1}$ is a Reference Signal Received Power (RSRP) from the first transmission point corresponding to the first reception power, $RSRP_{TP2}$ is a Reference Signal Received Power (RSRP) from the second transmission point corresponding to the second reception power, offset is the offset value, $P_{PUSCH,c}(i)$ is a transmission power of a physical uplink shared channel (PUSCH) at an i-th subframe, and $PL_{TP2}$ is a downlink pathloss from the second transmission point.

9. The method according to claim 1, wherein the offset value is associated with extension of the size of a cell region of the second transmission point.

10. The method according to claim 1, wherein the first transmission point is a macro eNB and the second transmission point is a micro eNB.

11. A method for performing a handover of a first transmission point in a wireless communication system, the method comprising:
receiving a measurement report from a user equipment (UE);
requesting a handover of the user equipment (UE) to a second transmission point; and
transmitting a handover command to the user equipment (UE), when the first transmission point receives an acknowledgement in response to the request from the second transmission point,
wherein transmission of the measurement report is determined using a first reception power from the first transmission point, a second reception power from the second transmission point, an offset value, and a value related to uplink transmission power of the user equipment (UE).

12. A user equipment (UE) apparatus for use in a wireless communication system comprising:
a reception module; and
a processor,
wherein the processor measures a first reception power from a first transmission point and a second reception power from a second transmission point, and determines transmission of a measurement report for the handover to the second transmission point,
where the transmission of the measurement report is determined using the first reception power, the second reception power, an offset value, and a value related to uplink transmission power of the user equipment (UE).

13. A first transmission point apparatus for use in a wireless communication system comprising:
a transmission module; and
a processor,
wherein the processor receives a measurement report from a user equipment (UE), requests a handover of the user equipment (UE) to a second transmission point, and transmits a handover command to the user equipment (UE) upon receiving an acknowledgement message of the request from the second transmission point,
where transmission of the measurement report is determined using a first reception power from the first transmission point, a second reception power from the second transmission point, an offset value, and a value related to uplink transmission power of the user equipment (UE).

* * * * *